Oct. 23, 1951 — H. S. PIERCE — 2,572,755
BALANCE CHAIN
Filed March 1, 1948 — 2 SHEETS—SHEET 1
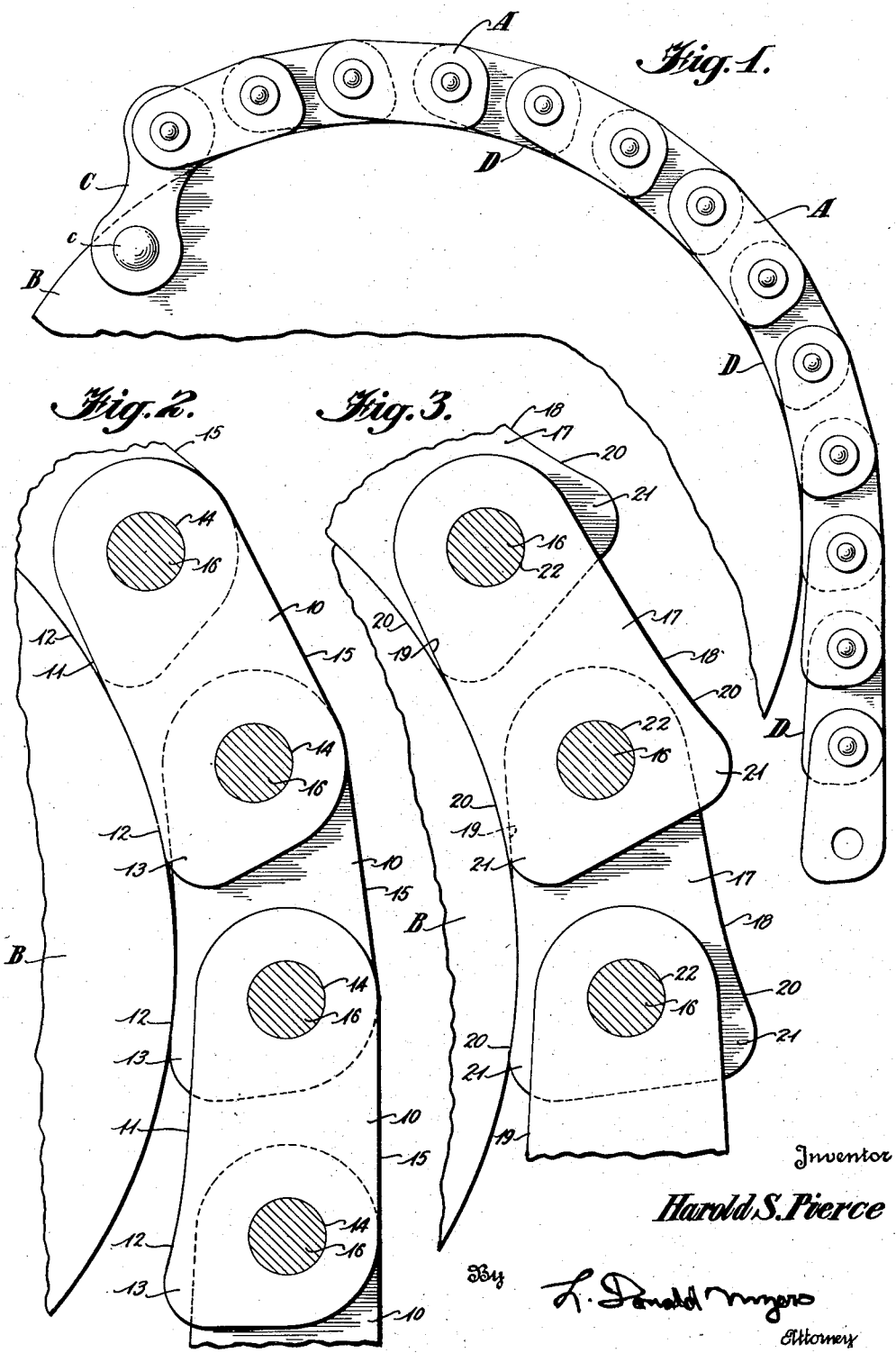
Inventor
Harold S. Pierce Oct. 23, 1951     H. S. PIERCE     2,572,755
BALANCE CHAIN
Filed March 1, 1948     2 SHEETS—SHEET 2
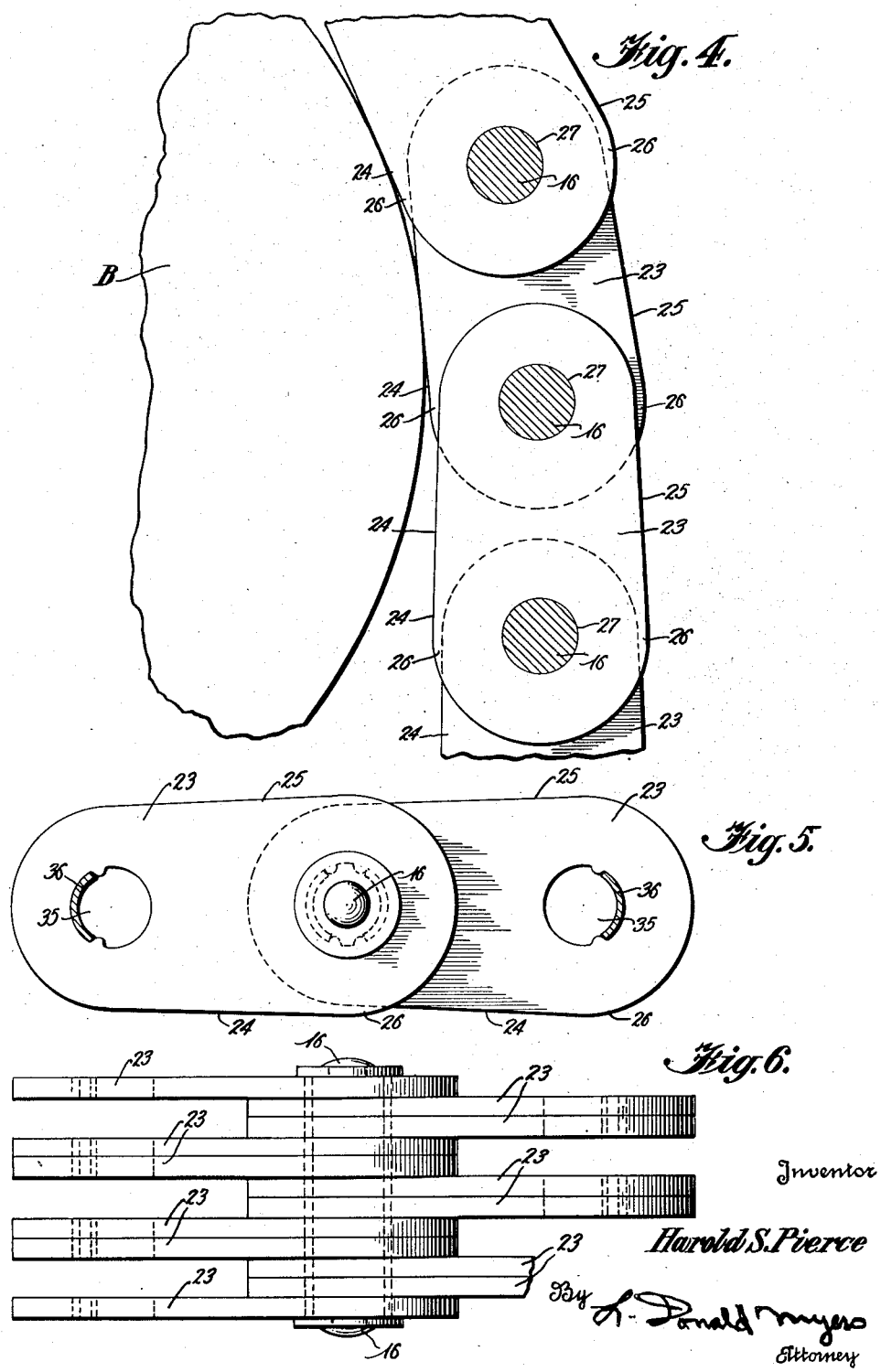

Patented Oct. 23, 1951

2,572,755

UNITED STATES PATENT OFFICE 2,572,755

BALANCE CHAIN

Harold S. Pierce, Indianapolis, Ind., assignor to Link-Belt Company, a corporation of Illinois Application March 1, 1948, Serial No. 12,290

12 Claims. (Cl. 74—216.5)

This invention relates to new and useful improvements in balance chains, and is particularly adapted for use in those instances where reduction of wear on the pulley surface and accuracy of chain movement relative to pulley rotation is of great importance as in a traverse lift device.

The conventional type of balance or traverse lift chain used is anchored at one end to a pulley or drum having a smooth circumferential surface. This connection is such that rotation of the pulley will cause the chain to wind or unwind around the pulley thus raising or lowering the free end of the chain. The usual practice is to always keep a portion of the chain at its anchored end wrapped about the pulley so that rotation of the pulley will raise or lower the remainder of the chain in a single vertical line.

The application of a device of this type to an operation where extreme accuracy is essential necessitates reducing wear on the pulley and chain to a minimum in order to avoid a reduction in the effective or pitch diameter of the pulley. Any material reduction in the effective pulley diameter allows the same length of chain to reach further around the pulley and requires an increase in the amount of rotation of the pulley to raise or lower the free end of the chain an equal vertical distance.

It has been the practice to use balance chains having articulating joints which result in movement at the contacting surfaces after engagement between the chain and pulley has been established. This movement is resisted by friction between the two surfaces which results in a wearing away of the pulley face and a loss of efficiency of the chain. This wearing away of the pulley face causes a progressively greater amount of friction which in turn causes an increase in wear on the surface. Thus, the wear and loss of efficiency increase in rate as well as in magnitude.

In a balance type device where the power needed for operation depends upon the friction load or loss, a small loss of efficiency might double the power requirements for operation. For example, a chain and pulley having an efficiency of 96 per cent would require twice as much power for operation as a chain and pulley having 98 per cent efficiency. From this example, it is clear that small changes in the efficiency of a device of this type are of great importance.

From the above discussion, it can be established that the fundamental fault in the chains of this type previously known is the friction between the pulley face and the articulating chain members in contact with the pulley face created by relative movement of the members as the pulley is rotated. This friction causes loss of efficiency and wearing of parts. Wearing of the parts, in turn, causes a lack of uniformity in the effective diameter of the pulley and variable movement of the free end of the chain for a given angular rotation of the pulley.

In addition to the above, the contact between the pulley face and chain members, has in the past commonly been a line contact which resulted in very high unit pressures. These high unit pressures coupled with the friction already discussed served to magnify all of the previously discussed undesirable results.

It is the primary object of this invention to provide a balance chain so constructed as to prohibit relative movement between the pulley face and chain members after their contacting surfaces have become engaged, thus reducing wear on the pulley face.

Another object of the invention is to provide a balance chain having an increased operating efficiency.

A further important object of the invention is to provide a balance chain having a greatly decreased unit pressure between the pulley face and chain as a result of an increase in the area of contact between the two members.

Other objects and advantages of the invention will be apparent during the course of the following description.

In the accompanying drawings forming a part of this specification and in which like numerals are employed to designate like parts throughout the same, Fig. 1 is a side elevational view of a pulley and a section of a balance chain embodying this invention, Fig. 2 is a detail elevational view of a section of the balance chain illustrated in Fig. 1, Fig. 3 is a side elevational view of a section of a balance chain that is a modification of the chain illustrated in Figs. 1 and 2, Fig. 4 is a side elevational view of a section of a balance chain showing a further variation of the invention, Fig. 5 is a side elevation showing one of the various types of connections that may be used to form articulating joints between links of the balance chains, and Fig. 6 is a plan view of the connection shown in Fig. 5.

In the drawings, wherein for the purpose of illustration are shown the preferred embodiments of this invention, Fig. 1 illustrates a length of balance chain A operatively connected to a pulley B by the coupling link C and the connecting pin c. The chain A has a contact face D adjacent to the surface of the pulley B and in contact therewith along that portion of the chain A that is wrapped about the pulley B. The end of the chain A connected to the pulley B will be referred to as the following end and the free end of the chain A as the leading end.

Referring now to Fig. 2 for a detailed description of the components of the chain A illustrated in Fig. 1 it is seen that the chain A is composed of a series of pitches and that each pitch is made up of identical link plates 10. Each of the link plates 10 is provided with a contact edge 11 that is curved along its leading end portion 12 to conform with a portion of the peripheral surface of the pulley B. The curved end portion 12 provides a raised portion 13 in the standing depth of the link plates 10.

Each of the link plates 10 has a pitch hole 14 through each of its end portions at equal distances from the back edge 15, and the pitch holes 14 through the adjacent end portions of successive pitches are alined to receive articulating joint pins 16 which connect the pitches for articulation about the axes of the joint pins 16.

During operation of the device, the pulley B is rotated in opposite directions causing the chain A to wind about and unwind from the pulley B. In either direction of rotation, there is an articulation or relative movement between the link plates 10 of adjacent pitches. The raised portions 13 at the leading ends 12 of the link plates 10 cause the following end portions of the connected link plates 10 of the adjacent pitches to be displaced away from the contact face D of the chain. In other words, the minimum distance from the single axis of articulation, for any given pair of connected pitches of link plates, to the contact edges 11 at the leading ends 12 of the link plates 10 of one pitch is greater than the minimum distance from the same axis of articulation to the contact edges 11 at the following end portions of the link plates 10 of the connected pitch. This prevents contact between the said following end portions and the surface of the pulley B. This freedom from contact eliminates loss of efficiency and wear due to friction between the parts. The curved end portions 12 provide relatively large contact areas between the link plates 10 and the pulley B to reduce the unit pressure between parts, and contact between the parts is of the touch and leave type.

Fig. 3 illustrates a modification of the chain A composed of a series of pitches of symmetrical link plates 17 having identical back edges 18 and contact edges 19. The edges 18 and 19 are concavely curved to conform with an arc of the circumference of the pulley B, and diverge at the leading end portions 20 to provide raised portions 21 in the standing depth of the link plates 17. The pitch holes 22 through the end portions of each link plate 17 are centered on the axis of symmetry of the link plates 17.

This modification in the link plates 17 makes possible the use of either face of the chain A as the contact face D. In regard to the construction of the joints, function, and operation, this modification is identical with that of the chain A illustrated in Figs. 1 and 2, and like reference characters are used to designate the articulating joint pins 16.

Fig. 4 illustrates a further modification of the chain A, whereby the symmetrical link plates 23 of each pitch have edges 24 and 25 converging uniformly toward the following end portions of the link plates 23. The leading end portions of the edges 24 and 25 are thus provided with raised portions 26 in the standing depth of the link plates 23. The pitch holes 27 through each end of the link plates 23 are centered on the axis of symmetry of link plates 23, and the joint pins 16 being the same as those illustrated in Figs. 2 and 3 are so designated. Operation of the chain A remains unchanged with the exception of a reduced contact area between the pulley B and the chain A and the adaptation of the chain A for use in conjunction with pulleys of different diameter than the pulley B. Both of these exceptions are a result of the contact edges 24 being modified from an arcuate to a linear surface.

The connections between adjacent pitches of the chain A are not limited to the type illustrated in Figs. 1 to 4 inclusive. Any conventional type of connection will function equally well in any of the modifications herebefore described and shown. Figs. 5 and 6 illustrate a conventional connection used in conjunction with the modification of chain A illustrated in Fig. 4 wherein the pitch holes 35 are adapted to receive bearing members 36.

The transverse rows of link plates 23 across adjacent pitches as illustrated in Fig. 6 represent only one of the many possible arrangements whereby the width of the chain A may be varied to meet operational requirements. It is desirable that adjacent pitches contain an equal number of link plates 23 and that a balanced distribution be maintained across the chain.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. A balance chain comprising, a multiplicity of link plates forming each pitch of the chain with each link plate having a smooth unbroken contact edge and a pitch hole through each of its end portions, the axis of one of said pitch holes being spaced a greater normal distance from said contact edge than the axis of the other pitch hole, and articulating joint pins passing through the pitch holes that are spaced a greater distance from the contact edge of the link plates in one pitch and the pitch holes that are spaced a lesser distance from the contact edge of the link plates of the adjacent pitch to connect the end portions of adjacent pitches.

2. In a balance chain, a plurality of pitches of symmetrically formed link plates each having a pitch hole through each of its end portions and longitudinally converging smooth unbroken top and bottom edge surfaces to provide one end portion of greater depth than the other end portion, the deeper end portions of the link plates of each pitch overlapping the end portions of lesser depth of the link plates of the adjacent pitches, and articulating joint pins passing through the pitch holes of said overlapped end portions to connect adjacent pitches.

3. In a device of the type described, a rotatable body having a smooth peripheral surface, a chain connected at one point to said body and adapted to contact said surface when wound about said body comprising, a plurality of pitches of symmetrically formed link plates each having one end portion of greater standing depth than the other end portion, the end portions of greater standing depth of each pitch overlapping the end portions of lesser standing depth of the adjacent pitches, and articulating joint parts connecting said overlapped end portions through the axis of symmetry of said link plates.

4. In a device of the type described, a rotatable body having a smooth unyielding peripheral surface, a chain connected at one point to said body and adapted to contact said surface when wound about said body comprising a plurality of pitches of link plates having their adjacent end portions overlapped, the end portions of the link plates of each pitch furthest from the point of connection to said rotatable body having a greater standing depth than the other end portions and providing a smooth unbroken contact edge surface adapted to conform with said peripheral surface, and articulating joint parts connecting said overlapped end portions.

5. A balance chain comprising, a plurality of pitches of link plates with each plate having a back edge parallel to the pitch line of said chain and a smooth unbroken contact edge arcuately approaching the pitch line to provide one end portion of each pitch with a greater standing depth than the other end portion, the end portion of greater standing depth of each pitch overlapping the end portion of lesser standing depth of each adjacent pitch, and articulating joint parts connecting said overlapped end portions.

6. In a device of the type described, a rotatable body having a smooth unyielding peripheral surface, a chain connected at one point to said body and adapted to contact said surface when wound about said body comprising, a plurality of pitches of link plates having their adjacent end portions overlapped, the end portion of each of said link plates furthest from the point of connection of said chain to said body presenting a smooth unbroken raised contact edge surface adapted to conform with said peripheral surface along one face of said chain, and articulating joint parts connecting said overlapped end portions.

7. In a balance chain, a plurality of pitches of link plates having their adjacent end portions overlapped and each of said link plates having a pitch hole through each of its end portions, the top and bottom edges of each link plate uniformly converging toward one of its end portions to provide smooth unbroken contact surfaces, and articulating joint pins passing through the pitch holes in said overlapped end portions to connect the deeper end portions of the link plates of each pitch with the end portions of lesser depth of the link plates of the adjacent pitch.

8. In a device of the type described, a pulley having a smooth unyielding peripheral surface, a chain connected at one point to said pulley comprising, a plurality of pitches of link plates having their adjacent end portions overlapped, the end portion of each pitch furthest from the point of connection to said pulley having the greater standing depth and the plates thereof having smooth unbroken contact edges uniformly converging toward the other end portion, and articulating joint parts connecting said overlapped end portions.

9. In a balance chain adapted to be trained over a smooth surfaced rotatable member, a plurality of pitches of link plates, with the plates having contact edges formed with smooth, unbroken surfaces for contact with said rotatable member and having their adjacent end portions overlapped, and articulating joint parts connecting said overlapped end portions of adjacent pitches for relative pivotal movement about a single axis of articulation, said overlapped end portions being so connected that the distance from the single axis of articulation to the contact edges at one end portion of each pitch is greater than the distance from the same single axis of articulation to the contact edges of the overlapped connected end portion of the adjacent pitch.

10. In a balance chain, a plurality of pitches of link plates with each plate having a contact edge formed with a smooth unbroken surface, each of said pitches having one end portion of greater standing depth than the other end portion, the end portion of greater standing depth of each pitch overlapping the end portion of lesser standing depth of the adjacent pitch, and articulating joint parts connecting said overlapped end portions for relative pivotal movement about a single axis of articulation.

11. In a device of the type described, a rotatable body having a smooth unyielding peripheral surface, a chain connected at one point to said body and adapted to contact said surface when wound about said body, said chain comprising a plurality of pitches of link plates having their adjacent end portions overlapped, the end portion of each pitch furthest from the point of connection to said rotatable body having a greater standing depth than the other end portion and presenting a contact edge formed with a smooth unbroken surface for engaging the surface of said rotatable body, and articulating joint parts connecting said overlapped end portions for relative pivotal movement about single axes of articulation so that the end portions of greater standing depth collectively provide the contact face for said chain.

12. In a device of the type described, a pulley having a smooth unyielding peripheral surface, a chain connected at one point to said pulley, said chain comprising a plurality of pitches of symmetrically formed link plates having their adjacent end portions overlapped, the end portion of each of said link plates furthest from the point of connection of said chain to said pulley providing a smooth unbroken raised contact edge surface adapted to conform with said peripheral surface of the pulley, and articulating joint parts connecting said overlapped end portions.

HAROLD S. PIERCE.

REFERENCES CITED

The following references are of record in the file of this patent:

UNITED STATES PATENTS

| Number | Name | Date |
| --- | --- | --- |
| 2,335,455 | Scott | Nov. 30, 1943 |

FOREIGN PATENTS

| Number | Country | Date |
| --- | --- | --- |
| 16,768 | Great Britain | Aug. 18, 1899 |
| 187,039 | Great Britain | Oct. 19, 1922 |